US010631215B2

(12) United States Patent
Van Lieshout et al.

(10) Patent No.: US 10,631,215 B2
(45) Date of Patent: Apr. 21, 2020

(54) METHOD AND APPARATUS FOR COMMUNICATING WITH A WIRELESS LOCAL AREA NETWORK IN A MOBILE COMMUNICATION SYSTEM

(71) Applicant: Samsung Electronics Co., Ltd., Suwon-si, Gyeonggi-do (KR)

(72) Inventors: Gerardus Johannes Petrus Van Lieshout, Staines (GB); Himke Van Der Velde, Staines (GB); Jae-Hyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/567,003

(22) PCT Filed: Apr. 15, 2016

(86) PCT No.: PCT/KR2016/003930
§ 371 (c)(1),
(2) Date: Oct. 16, 2017

(87) PCT Pub. No.: WO2016/167592
PCT Pub. Date: Oct. 20, 2016

(65) Prior Publication Data
US 2018/0103403 A1 Apr. 12, 2018

(30) Foreign Application Priority Data

Apr. 16, 2015 (GB) .................................. 1506493.4
Oct. 23, 2015 (KR) ........................ 10-2015-0148166

(51) Int. Cl.
*H04W 36/14* (2009.01)
*H04W 76/20* (2018.01)
(Continued)

(52) U.S. Cl.
CPC .......... *H04W 36/14* (2013.01); *H04W 28/08* (2013.01); *H04W 36/22* (2013.01); *H04W 76/20* (2018.02);
(Continued)

(58) Field of Classification Search
None
See application file for complete search history.

(56) References Cited

U.S. PATENT DOCUMENTS 9,674,747 B2 * 6/2017 Zalzalah ............... H04W 28/16
2012/0014316 A1 * 1/2012 Rahman ............. H04W 40/246
370/328
(Continued)

FOREIGN PATENT DOCUMENTS

WO   2011/123527 A1   10/2011
WO   2012/093349 A2    7/2012
(Continued)

OTHER PUBLICATIONS

3GPP; "New Work Item Proposal: WLAN/3GPP Radio Interworking", Dec. 3, 20173; GPP TSG| WG-RAN Meeting #62; RP-132101.
(Continued)

*Primary Examiner* — Chirag G Shah
*Assistant Examiner* — Srinivasa R Reddivalam
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). a method for operating a mobile terminal in a mobile communications network comprising a core network and a mobile base station, wherein the mobile terminal can transmit data to and receive data from the core network via the mobile base station or via a wireless local area network, WLAN, and the
(Continued)

method comprises determining an activity indicator indicative of data transmitted via or intended to be transmitted via the WLAN to the core network, and transmitting the activity indicator to the mobile base station.

8 Claims, 10 Drawing Sheets

(51) Int. Cl.

| | |
|---|---|
| H04W 36/22 | (2009.01) |
| H04W 84/12 | (2009.01) |
| H04W 28/08 | (2009.01) |
| H04W 88/10 | (2009.01) |
| H04W 88/12 | (2009.01) |
| H04W 76/16 | (2018.01) |

(52) U.S. Cl.
CPC ........... *H04W 84/12* (2013.01); *H04W 88/10* (2013.01); *H04W 88/12* (2013.01); *H04W 76/16* (2018.02)

(56) References Cited

U.S. PATENT DOCUMENTS

| | | | | |
|---|---|---|---|---|
| 2014/0098789 A1* | 4/2014 | Liu | ...................... | H04W 76/10 370/331 |
| 2014/0133298 A1* | 5/2014 | Han | ...................... | H04W 28/08 370/230 |
| 2014/0334446 A1 | 11/2014 | Lim et al. | | |
| 2016/0057687 A1* | 2/2016 | Horn | ...................... | H04W 24/10 370/331 |
| 2016/0219475 A1* | 7/2016 | Kim | .......................... | H04L 5/00 |
| 2016/0295482 A1* | 10/2016 | Belghoul | .............. | H04W 36/14 |
| 2017/0181070 A1* | 6/2017 | Gupta | ................... | H04W 28/08 |
| 2017/0257265 A1* | 9/2017 | Hong | ................... | H04L 41/0803 |
| 2017/0273125 A1* | 9/2017 | Teyeb | ............... | H04W 36/0027 |

FOREIGN PATENT DOCUMENTS

| | | |
|---|---|---|
| WO | 2014/094849 A1 | 6/2014 |
| WO | 2014/162172 A1 | 10/2014 |
| WO | 2014/163549 A1 | 10/2014 |
| WO | 2014/165832 A1 | 10/2014 |
| WO | 2015/085273 A1 | 6/2015 |

OTHER PUBLICATIONS

3GPP; "New WI Proposal: LTE-WLAN Radio Level Integration and Interworking Enhancement", Mar. 9, 2015; 3GPP TSG RAN Meeting #67; RP-150510.

* cited by examiner

METHOD AND APPARATUS FOR COMMUNICATING WITH A WIRELESS LOCAL AREA NETWORK IN A MOBILE COMMUNICATION SYSTEM

CROSS-REFERENCE TO RELATED APPLICATION(S)

This application is a U.S. National Stage application under 35 U.S.C. § 371 of an International application filed on Apr. 15, 2016 and assigned application number PCT/KR2016/003930, which claimed the benefit of a Great Britain patent application filed on Apr. 16, 2015 in United Kingdom Intellectual Property Office and assigned Serial number 1506493.4 and a Korean Patent Application filed on Oct. 23, 2015 in the Korean Intellectual Property Office and assigned Serial number No. 10-2015-0148166, the entire disclosure of each which are hereby incorporated by reference.

TECHNICAL FIELD

This invention relates to the interworking of a Wireless Local Area Network (WLAN) and a Long Term Evolution (LTE) network. In particular, certain embodiments relate to specific improvements to the way in which WLAN and LTE may be interworked, specifically relating to the way in which data traffic is offloaded from LTE to WLAN and WLAN to LTE.

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Wireless or mobile (cellular) communications networks in which a mobile terminal (UE, such as a mobile handset) communicates via a radio link to a network of base stations or other wireless access points connected to a telecommunications network, have undergone rapid development through a number of generations. The initial deployment of systems using analogue signalling has been superseded by Second Generation (2G) digital systems such as Global System for Mobile communications (GSM), which typically use a radio access technology known as GSM Enhanced Data rates for GSM Evolution Radio Access Network (GERAN), combined with an improved core network.

Second generation systems have themselves been largely replaced by or augmented by Third Generation (3G) digital systems such as the Universal Mobile Telecommunications System (UMTS), which uses a Universal Terrestrial Radio Access Network (UTRAN) radio access technology and a similar core network to GSM. UMTS is specified in standards produced by 3GPP. Third generation standards provide for a greater throughput of data than is provided by second generation systems. This trend is continued with the move towards Fourth Generation (4G) systems.

3GPP design, specify and standardise technologies for mobile wireless communications networks. Specifically, 3GPP produces a series of Technical Reports (TR) and Technical Specifications (TS) that define 3GPP technologies. The focus of 3GPP is currently the specification of standards beyond 3G, and in particular on standard for the Evolved Packet Core and the enhanced radio access network called "E-UTRAN". The E-UTRAN uses the LTE radio technology, which offers potentially greater capacity and additional features compared with previous standards. Despite LTE strictly referring only to the air interface, LTE is commonly used to refer to the whole system including EPC and E-UTRAN. LTE is used in this sense in the remainder of this specification, including when referring to LTE enhancements, such as LTE Advanced. LTE is an evolution of UMTS and shares certain high level components and protocols with UMTS. LTE Advanced offers still higher data rates compared to LTE and is defined by 3GPP standards releases from 3GPP Release 10 up to and including 3GPP Release 12. LTE Advanced is considered to be a 4G mobile communication system by the International Telecommunication Union (ITU).

Particular embodiments of the present invention may be implemented within an LTE mobile network (though the present invention may be considered to be applicable to many types of wireless communication network). Therefore, an overview of an LTE network is shown in FIG. 1. The LTE system comprises three high level components: at least one UE 102, the E-UTRAN 104 and the EPC 106. The EPC 106, or core network as it may also be known, communicates with Packet Data Networks (PDNs) and servers 108 in the outside world. FIG. 1 shows the key component parts of the EPC 106. It will be appreciated that FIG. 1 is a simplification and a typical implementation of LTE will include further components. In FIG. 1 interfaces between different parts of the LTE system are shown. The double ended arrow indicates the air interface between the UE 102 and the E-UTRAN 104. For the remaining interfaces user data is represented by solid lines and signalling is represented by dashed lines.

The E-UTRAN 104, or radio access network (RAN) as it may also be known, comprises a single type of component: an eNB (E-UTRAN Node B) which is responsible for handling radio communications between the UE 102 and the EPC 106 across the air interface. An eNB controls UEs 102 in one or more cell. LTE is a cellular system in which the eNBs provide coverage over one or more cells. Typically there is a plurality of eNBs within an LTE system. In general, a UE in LTE communicates with one eNB through one cell at a time, where an eNB may also be referred to as a mobile base station.

Key components of the EPC 106 are shown in FIG. 1. It will be appreciated that in an LTE network there may be more than one of each component according to the number of UEs 102, the geographical area of the network and the volume of data to be transported across the network. Data traffic is passed between each eNB and a corresponding Serving Gateway (S-GW) 110 which routes data between the eNB and a PDN Gateway (P-GW) 112. The P-GW 112 is responsible for connecting a UE to one or more servers or PDNs 108 in the outside world. The Mobility Management Entity (MME) 114 controls the high-level operation of the UE 102 through signalling messages exchanged with the UE 102 through the E-UTRAN 104. Each UE is registered with a single MME. There is no direct signalling pathway between the MME 114 and the UE 102 (communication with the UE 102 being across the air interface via the E-UTRAN 104). Signalling messages between the MME 114 and the UE 102 comprise EPS Session Management (ESM) protocol messages controlling the flow of data from the UE to the outside world and EPS Mobility Management (EMM) protocol messages controlling the rerouting of signalling and data flows when the UE 102 moves between eNBs within the E-UTRAN. The MME 114 exchanges signalling traffic with the S-GW 110 to assist with routing data traffic. The MME 114 also communicates with a Home Subscriber Server (HSS) 116 which stores information about users registered with the network.

In additional to the architectural structure discussed above, LTE also includes the concept of bearers, and in particular, EPS bearers (referred to as bearers for the remaining of this description), where data transmitted from and received by a UE is associated with a particular bearer. Bearers define how UE data is handled as it passes through the LTE network and may be viewed as a virtual data pipe extending through the core network, where a bearer may have quality of service associated with it, such as a guaranteed bitrate for example. A bearer serves to channel packet data to a Packet Data Network (PDN, also referred to as a Public Data Network) outside of the LTE network via the S-GW and P-GW, where a further external non-LTE bearer may be required to channel data from the EPC to an external network. Each bearer is therefore associated with a certain PDN. Each bearer is also identified by a logical channel id (LCID) at the Medium Access Control (MAC) level, where one bearer corresponds to one logical channel.

Within LTE there are two types of EPS bearer: a default bearer and a dedicated bearer. A UE is assigned a default EPS bearer when it first connects to a PDN and it is maintained whilst the UE is still attached to the network, where the default bearer provides a best effort service and thus does not guarantee a particular bitrate. The default bearer also has an associated Internet Protocol (IP) address and a UE may have one or more default bearers.

In addition to a default bearer, a UE may also have one or more dedicated bearers. Dedicated bearers are each associated with a parent default bearer and may provide a particular guaranteed bitrate, which is usually in excess of the bitrate expected of the default bearer. Consequently, dedicated bearers are often used to provide a particular level of service to particular data type, for example, a dedicated bearer may be set up to provide live video to a UE where the dedicated bearer has a relatively high guaranteed bitrate.

A bearer may carry more than one type of data, however, the data packets within each bearer experience the same treatment regardless of their content. Conventionally, data packets sent across a particular bearer each have a Packet Data Convergence Protocol (PDCP) sequence number for re-ordering PDCP PDU's potentially received out of sequence, and also for ciphering/integrity protection. Furthermore, since each bearer may be associated with a particular PDCP reception instance, data packets within LTE are transported with a bearer identification and a packet number such that received data packets can be delivered to the correct PDCP reception instance. For example, the bearer identification may be included in an LTE MAC layer header.

The data packets transmitted over a particular bearer are also associated with a particular IP flow, where a bearer may have a plurality of associated IP flows. The IP flows associated with a bearer relate to a set of data packets that are exchanged between two nodes, for example, a UE and a video streaming server.

An increase in consumer demand for wireless broadband data is evident from the fast uptake of LTE across the world. In view of this, and in view of the relatively high cost associated with increasing the capacity of LTE networks, data service suppliers and operators are increasingly studying how to augment those existing LTE networks. One such method involves using alternative wireless networks to compliment the broadband data services provided via LTE. Here, the operators would be able to offload traffic from the LTE wireless network to an alternative wireless networks, such as WLANs which operate in accordance with the Institute of Electrical and Electronic Engineers (IEEE) 802.11* standards, where this technique of traffic offloading maybe be referred to as LTE/WLAN interworking.

In 3GPP Release 12, offloading of data traffic from the LTE RAN (Radio Access Network) is defined for an architecture in which the WLAN is connected to the EPC. This is documented in 3GPP Work Item Description (WID) RP-132101. This offloading comprises the network (specifically the MME) specifying to a UE whether Internet Protocol (IP) traffic transported on bearers related to a PDN are considered to be allowed to be offloaded (offloadable) to a WLAN or not, the final decision on offloading is then performed by the UE. This is defined in TS 24.301 (WLAN offload acceptability 9.9.4.18). In order to enable the UE to determine whether the traffic of bearer is to be offloaded, each LTE cell may broadcast a WLAN cell list and offload thresholds (TS 36.306; section 5.6), relating to for example:

LTE Reference Signal Received Power (RSRP) threshold
    LTE Reference Signal Received Quality (RSRQ) threshold
    WLAN channel utilisation
    WLAN backhaul rate
    WLAN Received Signal Strength Indicator (RSSI)

If threshold conditions are met, and the UE has bearers belonging to an "offloadable PDN", the UE can move traffic from the concerning PDN to WLAN. Note that the network, and in particular the eNB, has no direct control over whether the UE moves traffic since the eNB only provides the thresholds for a decision to be made by the UE.

In order to advance the concept of offloading LTE traffic onto WLANs, 3GPP continues working on two enhancements for the further integration of LTE and WLAN in 3GPP Release 13. These two alternative enhancements may be referred to as 3GPP/WLAN interworking (interworking) and 3GPP/WLAN aggregation (aggregation), where these two approaches differ in the manner in which a WLAN is integrated into the LTE architecture.

FIG. 2 provides a schematic illustration of the architecture for the interworking WLAN-LTE enhancement. The LTE network components correspond to those of FIG. 1, however, a WLAN 200 is integrated with the LTE architecture and is directly connected to the core network (S/P-GW) such that UE mobility between LTE and WLAN is network controlled by, for example, the serving eNB 202 as opposed to the UE as specified in 3GPP Release 12. Data packets may be communicated between the UE and the core network either via the eNB and the conventional LTE air interface or alternatively may be communicated via the WLAN to the core network. The interworking enhancement of FIG. 2 is based on the same architecture as the Release 12 approach to WLAN-LTE offloading described above in which the UE determines which traffic to offload if certain thresholds are met.

In the architecture of FIG. 2, data which would conventionally be communicated via the LTE interface may be offloaded to the WLAN, which among other benefits, may free up resources in the LTE air interface and also potentially provide enhanced data rates to the UE. In this architecture, as opposed to that of Release 12, the mobility of the UE between LTE and the WLAN is network controlled, for example the eNB may issue commands to transfer/offload data traffic from LTE to WLAN. To achieve this, the UE may report a number of measurements to the eNB, such as WLAN RSSI, WLAN cell availability, WLAN backhaul rate, WLAN channel utilisation etc. Based on these measurements, the eNB may then command the UE to move the traffic of certain bearers to the WLAN or back to LTE from the WLAN. It will be appreciated that because traffic sent to/from the core network via WLAN bypasses the eNB, though the eNB may be aware of some WLAN characteristics by virtue of the UE measurement reports, the eNB may not be directly aware of the amount of traffic that is transported over WLAN.

FIG. 3 provides a schematic illustration of the aggregation WLAN-LTE enhancement architecture. The LTE network components correspond to those of FIG. 1, however, a WLAN 200 is integrated into the LTE architecture via a connection to the serving eNB. In this aggregation enhancement, UE mobility between LTE and WLAN is network controlled, by for example, the serving eNB 202. The aggregation enhancement architecture is based on that known for LTE dual connectivity, which will be familiar to the skilled person. Data packets maybe communicated between the UE and the eNB either directly to the eNB via the conventional LTE air interface or alternatively may be communicated via a WLAN to the eNB. Consequently, in contrast to the interworking architecture, the eNB will handle all traffic being transmitted to and received from the UE whether it be via LTE or WLAN. The eNB may setup WLAN cells in addition to LTE cells and parallel traffic streams can occur on both radio interfaces. As for the interworking architecture, data which would conventionally be communicated via the LTE interface may be offloaded to the WLAN, which among other benefits, may free up resources in the LTE air interface and also potentially provide enhanced data rates to the UE.

DISCLOSURE OF INVENTION

Technical Problem

Although both the interworking and aggregation enhancements may provide benefits it terms of network capacity for example, they also have a number of drawbacks due to the limited levels of integration between the LTE network and the WLAN and also due to the extent to which the core network, eNB or UE may control the offloading of traffic to and from a WLAN from and to the LTE network.

Solution to Problem

In accordance with a first aspect of the present invention, a method for operating a mobile terminal in a mobile communications network comprising a core network and a mobile base station is provided, wherein the mobile terminal can transmit data to and receive data from the core network via the mobile base station or via a wireless local area network, WLAN. The method comprises determining an activity indicator indicative of data transmitted via or intended to be transmitted via the WLAN to the core network; and transmitting the activity indicator to the mobile base station.

In certain embodiments the activity indicator may provide an indication of a throughput associated with transmissions from the mobile terminal to the core network via the WLAN.

In certain embodiments, the activity indicator may provide an indication of one or more of an expected throughput, a current throughput or a past throughput associated with transmissions from the mobile terminal to the core network via the WLAN.

In certain embodiments, the activity indicator may indicate that substantially no data has been transmitted by the mobile terminal to the core network via the WLAN during a predetermined period of time.

In certain embodiments, the activity indicator may indicate that substantially no data is intended to be transmitted by the mobile terminal to the core network via the WLAN during a predetermined period of time.

In certain embodiments, the predetermined period of time may be determined by the mobile base station, and the method may include receiving an indication of the predetermined period of time from the mobile base station.

In certain embodiments, the method may include receiving a WLAN connection reconfiguration indication from the mobile base station; and terminating a connection between the mobile terminal and the WLAN.

In certain embodiments, the activity indicator may provide an indication of data transmitted via or intended to be transmitted via the WLAN to the core network relative to a predetermined threshold.

In certain embodiments, the activity indicator may be indicative of a suggested WLAN configuration of the mobile terminal.

In accordance with another aspect of the present invention, a mobile terminal arranged to perform any of the above described methods is provided.

In accordance with another aspect of the present invention, a method for operating a mobile base station in a mobile communications network comprising a core network and a mobile terminal is provided, wherein the mobile base station can transmit data to and receive data from the core network and transmit data to and receive data from the mobile terminal, and the mobile terminal can transmit data to and receive data from the core network via the mobile base station or via a wireless local area network, WLAN. The method comprises receiving, from the mobile terminal, an activity indicator indicative of data transmitted via or intended to be transmitted via the WLAN to the core network from the mobile terminal; determining a WLAN connection reconfiguration indication based on the activity indicator; and transmitting the WLAN connection reconfiguration indication to the mobile terminal.

In certain embodiments, the activity indicator may provide an indication of a throughput associated with transmissions from the mobile terminal to the core network via the WLAN.

In certain embodiments, the activity indicator may provide an indication of one or more of an expected throughput, a current throughput or a past throughput associated with transmissions from the mobile terminal to the core network via the WLAN.

In certain embodiments, the activity indicator may indicate that substantially no data has been transmitted by the mobile terminal to the core network via the WLAN during a predetermined period of time.

In certain embodiments, the activity indicator may indicate that substantially no data is intended to be transmitted by the mobile terminal to the core network via the WLAN during a predetermined period of time.

In certain embodiments, the method may include determining the predetermined period of time; and transmitting an indication of the predetermined period of time to the mobile terminal.

In certain embodiments, the WLAN connection reconfiguration indication may indicate the termination of a connection between the mobile terminal and the WLAN.

In certain embodiments, the activity indicator may provide an indication of data transmitted via or intended to be transmitted via the WLAN to the core network by the mobile terminal relative to a predetermined threshold.

In certain embodiments, the activity indicator may be indicative of a suggested WLAN configuration of the mobile terminal.

In accordance with another aspect of the present invention, a mobile base station arranged to perform any of the above described methods is provided.

In accordance with another aspect of the present invention, a method for operating a mobile terminal in a mobile communications network comprising a core network and a mobile base station is provided, wherein the mobile terminal can transmit data packets to and receive data packets from the core network via the mobile base station or via a wireless local area network, WLAN, and the data packets are associated with one or more mobile communication bearers of the mobile communications network. The method comprises: receiving an indicator from the mobile base station, the indicator providing at least one of: an indication that one or more data packets associated with an identified bearer are permitted to be transmitted to and received from the core network via a WLAN, and an indication that one or more data packets associated with an identified bearer are permitted to be transmitted to and received from the mobile base station; determining, based on the indicator, one or more data packets associated with the identified bearer that are to be transmitted to and received from the mobile base station or one or more data packets associated with the identified bearer that are to be transmitted to and received from the core network via the WLAN; and transmitting and receiving the determined data packets to and from the mobile base station or to and from the core network via the WLAN.

In certain embodiments, the identified bearer may include one or more Internet protocol, IP, flows, each IP flow having one or more associated data packets, and the data packets associated with each IP flow may be transmitted to and received from the mobile base station or transmitted to and received from the core network via the WLAN, and the one or more data packets permitted to be transmitted to and received from the core network via a WLAN may be associated with an IP flow whose associated data packets are currently transmitted to and received from the mobile base station; and the one or more data packets permitted to be transmitted to and received from the mobile base station may be associated with an IP flow whose associated data packets are currently transmitted to and received from the core network via the WLAN.

In certain embodiments, the indicator may provide an indication of a relative level of traffic associated with the identified bearer that is to be transmitted to and received from the core network via a WLAN or a relative level of traffic associated with the identified bearer that is to be transmitted to and received from the mobile base station.

In certain embodiments, the identified bearer may include one or more IP flows, each IP flow having one or more associated data packets, and method may include determining, based on the indicator, one or more IP flows whose associated data packets are to be transmitted to and received from the mobile base station or to be transmitted to and received from the core network via the WLAN.

In certain embodiments, the identified bearer may include one or more IP flows and the indicator may provide an indication of a level of traffic associated with the identified bearer that is to be transmitted to and received from the core network via a WLAN or that is to be transmitted to and received from the mobile base station relative to at least one of: a number of IP flows included in the identified bearer; a proportion of traffic associated with the identified bearer; and a volume of traffic associated with the identified bearer.

In certain embodiments, the identified bearer may include one or more IP flows, each IP flow having one or more associated data packets, and the indicator may provide an indication of an identity of one or more IP flows whose associated data packets are to be transmitted to and received from the core network via the WLAN or are to be transmitted to and received from the mobile base station.

In certain embodiments, the bearer may include one or more IP flows, each IP flow having one or more associated data packets, and the method may include receiving a second indicator from the mobile base station, the second indicator providing at least one of: an indication of one or more IP flows included in the identified bearer whose associated data packets are to be transmitted to and received from the core network via a WLAN; and an indication of one or more IP flows included in the identified bearer whose associated data packets are to be transmitted to and received from the mobile base station; and the method may include determining, based on the indicator and the second indicator, one or more IP flows whose associated data packets are to be transmitted to and received from the mobile base station or that are to be transmitted to and received from the core network via the WLAN.

In accordance with another aspect of the present invention, a mobile terminal arranged to perform any of the above described methods is provided.

In accordance with another aspect of the present invention, a method for operating a mobile base station in a mobile communications network comprising a core network and a mobile terminal is provided, wherein the mobile base station can transmit data packets to and receive data packets from the mobile terminal, and the mobile terminal can transmit data packets to and receive data packets from the mobile base station and transmit data packets to and receive data packets from the core network via a wireless local area network, WLAN, and wherein the data packets are associated with one or more mobile communication bearers of the mobile communications network. The method comprises: identifying a bearer of which one or more associated data packets are permitted to be transmitted to and received from the core network by the mobile device via the WLAN, or permitted to be transmitted to and received from mobile base station by the mobile terminal; transmitting an indicator to the mobile terminal, the indicator providing at least one of: an indication that one or more data packets associated with the identified bearer are permitted to be transmitted to and received from the core network via a WLAN by the mobile terminal; and an indication that one or more data packets associated with the identified bearer are permitted to be transmitted to and received from the mobile base station by the mobile terminal.

In certain embodiments, the identified bearer may include one or more Internet protocol, IP, flows, each IP flow having one or more associated data packets, and the data packets associated with each IP flow may be transmitted to and received from the mobile base station by the mobile device or transmitted to and received from the core network via the WLAN by the mobile device, and wherein the one or more data packets permitted to be transmitted to and received from the core network via a WLAN are associated with an IP flow whose associated data packets are currently transmitted to and received from the mobile base station; and the one or more data packets permitted to be transmitted to and received from the mobile base station are associated with an IP flow whose associated data packets are currently transmitted to and received from the core network via the WLAN.

In certain embodiments, the method may include determining a relative level of traffic associated with the identified bearer that is to be transmitted to and received from the core network by the mobile terminal via a WLAN or a relative level of traffic associated with the identified bearer that is to be transmitted to and received from the mobile base station by the mobile terminal; and the indicator may include an indication of the determined relative level.

In certain embodiments, the identified bearer may include one or more IP flows and the indicator provides an indication of a level of traffic associated with the identified bearer that is to be transmitted to and received from the core network via a WLAN by the mobile terminal or that is to be transmitted to and received from the mobile base station by the mobile terminal, and the relative a level of traffic associated with the identified bearer relates to at least one of: a number of IP flows included the identified bearer; a proportion of traffic associated with the identified bearer; and a volume of traffic associated with the identified bearer.

In certain embodiments, the identified bearer may include one or more IP flows, each IP flow having one or more associated data packets, and the method may include determining an identity of one or more IP flows whose associated data packets are to be transmitted to and received from the core network via the WLAN by the mobile terminal or are to be transmitted to and received from the mobile base station by the mobile terminal, and the indicator may include an indication of the determined one or more IP flows.

In certain embodiments, the bearer may include one or more IP flows, each IP flow having one or more associated data packets, and the method may include: determining an identity of one or more IP flows whose associated data packets are to be transmitted to and received from the core network via the WLAN by the mobile terminal or are to be transmitted to and received from the mobile base station by the mobile terminal; and transmitting a second indicator to the mobile terminal, the second indicator providing at least one of: an indication of one or more of the determined IP flows included in the identified bearer whose associated data packets are to be transmitted to and received from the core network via a WLAN by the mobile terminal; and an indication of one or more of the determined IP flows included in the identified bearer whose associated data packets are to be transmitted to and received from the mobile base station by the mobile terminal.

In accordance with another aspect of the present invention, a mobile base station arranged to perform any of the above described methods is provided.

In accordance with another aspect of the present invention, a method of a mobile terminal communicating with a wireless local area network (WLAN) in a mobile communication network comprising a core network, the method comprising: determining data to be transmitted via the WLAN to the mobile communication network; and transmitting, to a base station, information indicating that whether there is the data.

In accordance with another aspect of the present invention, a mobile terminal for communicating with a wireless local area network (WLAN) in a mobile communication network comprising a core network, the mobile terminal comprising: a controller configured to determine data to be transmitted via the WLAN to the mobile communication network; and a transceiver configured to transmit, to a base station, information indicating that whether there is the data.

In accordance with another aspect of the present invention, A method of a base station communicating with a wireless local area network (WLAN) in a mobile communication network comprising a core network, the method comprising: receiving, from a mobile terminal, information indicating that whether there is data to be transmitted via the WLAN to the mobile communication network; determining reconnection of the mobile terminal and the WLAN; and transmitting, to the mobile terminal, a command indicating the reconnection of the mobile terminal and the WLAN.

In accordance with another aspect of the present invention, A base station communicating with a wireless local area network (WLAN) in a mobile communication network comprising a core network, the base station comprising: a receiver configured to receive, from a mobile terminal, information indicating that whether there is data to be transmitted via the WLAN to the mobile communication network; a controller configured to determine reconnection of the mobile terminal and the WLAN; and a transmitter configured to transmit, to the mobile terminal, a command indicating the reconnection of the mobile terminal and the WLAN.

BRIEF DESCRIPTION OF DRAWINGS

Embodiments of the invention are further described hereinafter with reference to the accompanying drawings, in which.

BEST MODE FOR CARRYING OUT THE INVENTION

Embodiments of the present invention will now be described in the context of an LTE compliant mobile wireless communications network operating in accordance with the 3GPP LTE standards up to Release-12 and beyond? in particular with a view to Release-13. However, it will be understood that this is by way of example only and that other embodiments may involve other wireless networks, operating at least partially in compliance with other releases and standards. Embodiments of the present invention will now be described in the context of a wireless telecommunication network including a mobile device or mobile terminal (for example, user equipment, UE) and a base station or mobile base station (for example, E-UTRAN Node B or eNB) and a further wireless network access point such as a WLAN access point or router.

Additional UE Reporting

Figure 1:
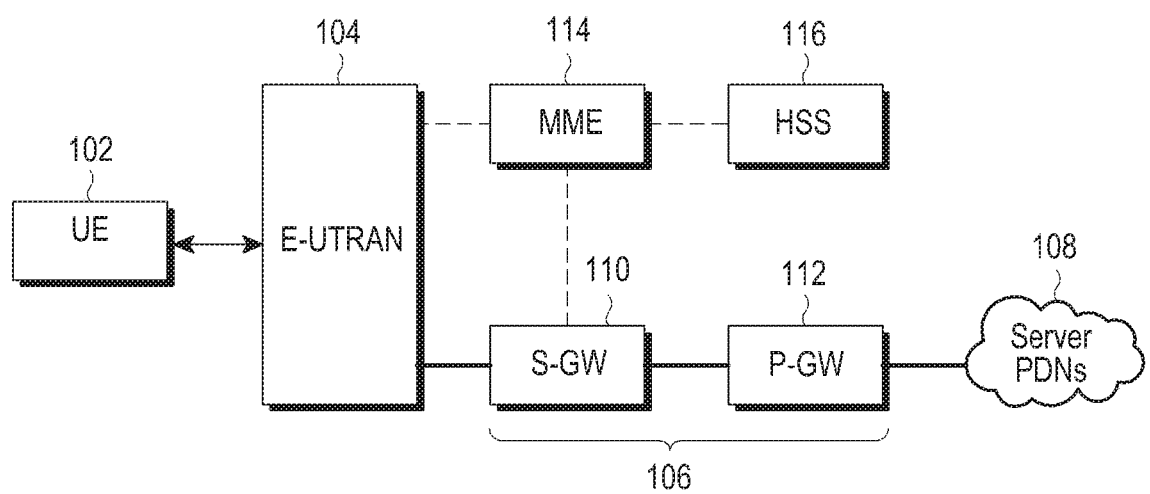
FIG. 1 schematically illustrates an overview of an LTE mobile communication network.
Figure 2:
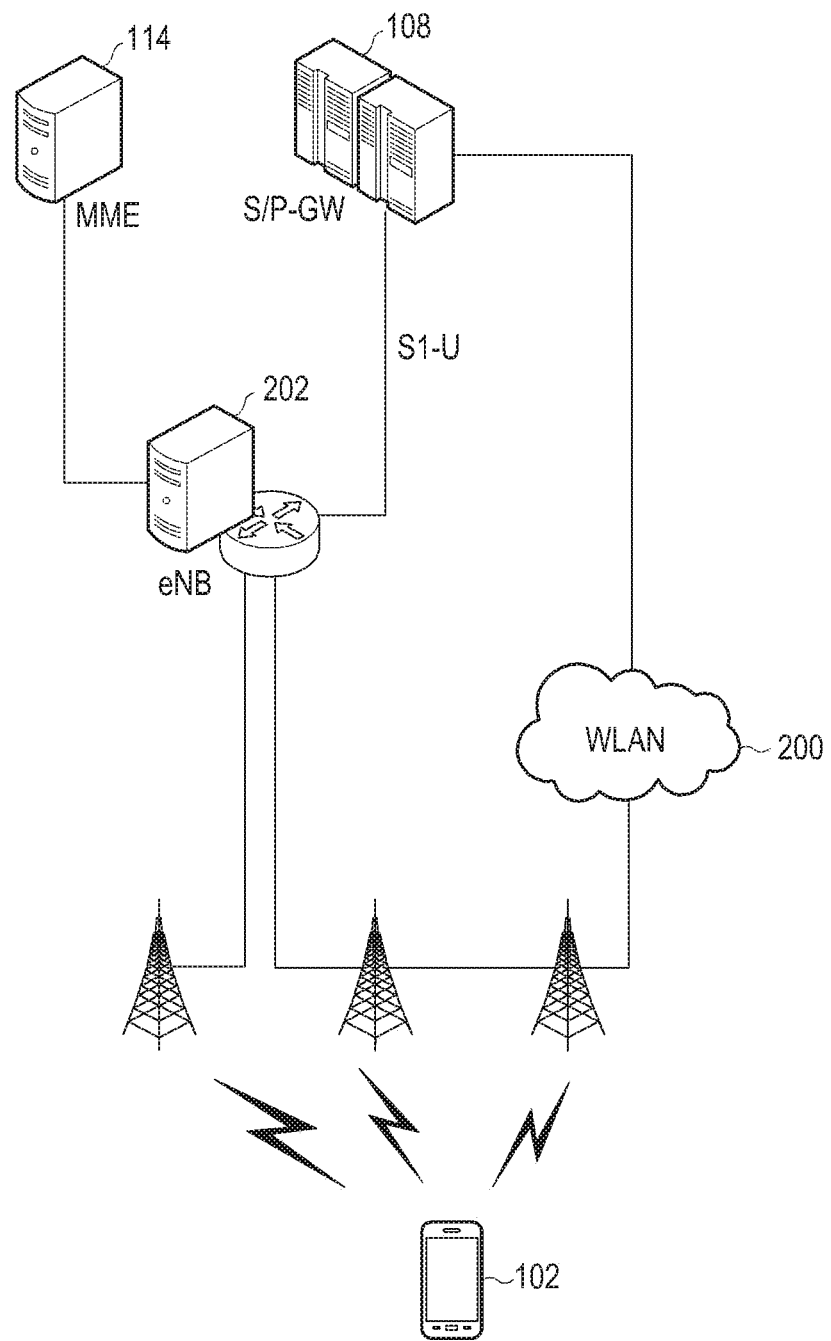
FIG. 2 schematically illustrates an architecture of a WLAN-LTE interworking enhancement to an LTE network.
Figure 3:
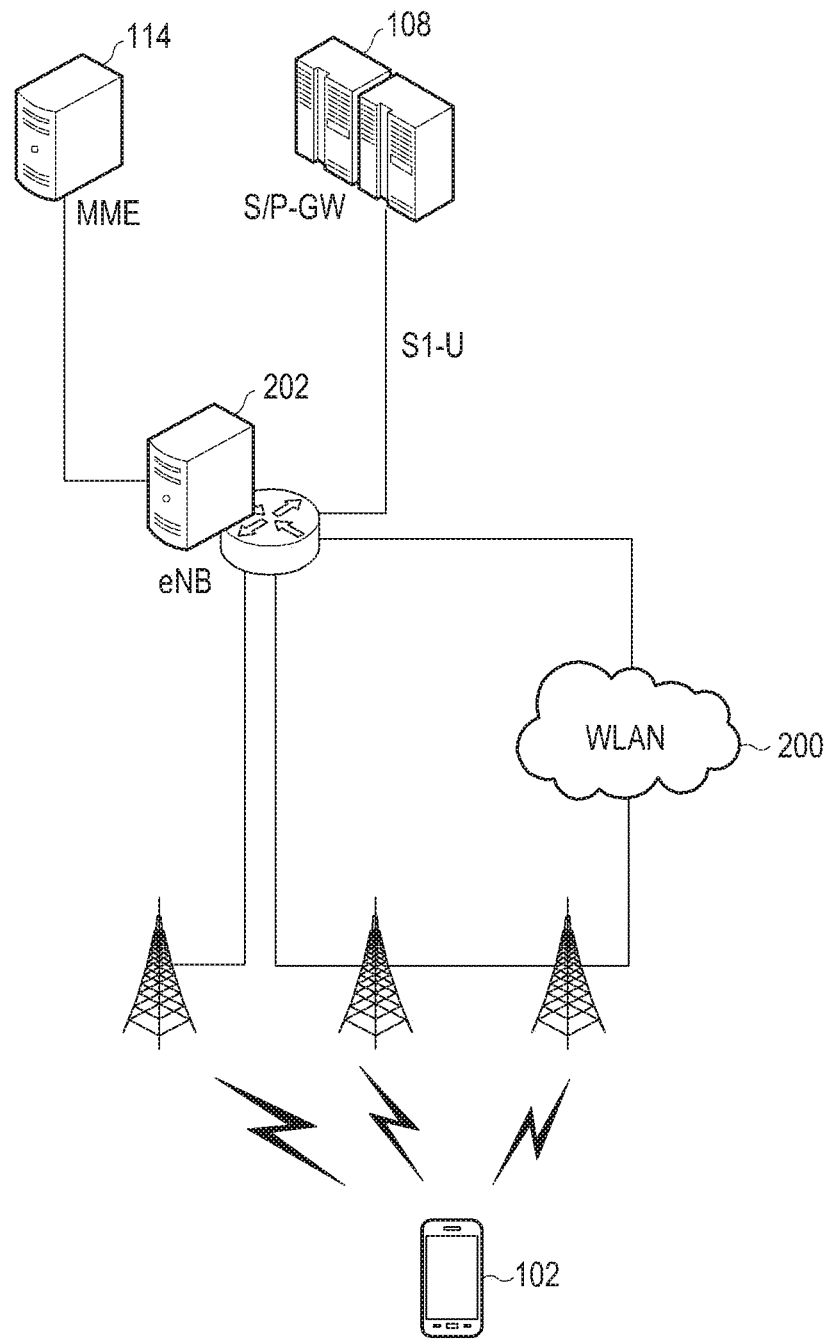
FIG. 3 schematically illustrates an architecture of a WLAN-LTE aggregation enhancement to an LTE network.

Having regard to the interworking architecture of FIG. 2, if traffic is commanded to be handled over the WLAN, it is beneficial to keep the UE in a CONNECTED state in LTE so that the eNB can receive measurement reports from the UE. For example, if the WLAN RSSI decreases to an unacceptable level, such an event can be reported to the eNB by the UE and traffic which had been offloaded to the WLAN may be transferred back to LTE. Furthermore, if the traffic rate on the WLAN has decreased due to congestion on the WLAN or because the UE no longer requires to transmit and receive relatively large volumes of data across the WLAN, it may be beneficial to transfer all offloaded traffic remaining on the WLAN back to LTE such that the UE is not required to operate both LTE and WLAN transceivers in parallel. Similarly, if the UE no longer has any data to transmit via the WLAN or LTE, the UE will no longer be required to maintain itself in a connected state with respect to the LTE network or the WLAN. Therefore ending the WLAN connection and the LTE CONNECTED state at the UE may once again reduce power consumption.

However, though the eNB may be aware of WLAN characteristics such as RSSI via UE reporting, since the WLAN traffic does not pass through a UE's serving eNB and the eNB is responsible for commanding the offloading of traffic, the eNB is not aware of the traffic volumes and characteristics of the traffic passing through the WLAN and offloading of traffic may not be able to be reconfigured in response to the traffic volumes and characteristics of the traffic passing through the WLAN. Consequently, the eNB may not be able to perform the beneficial actions outlined above in response to changing WLAN traffic characteristics.

In accordance with an embodiment of the present invention, in order to address the above mentioned disadvantages, one or more additional UE reporting measurements are defined for the interworking enhancement architecture, where the additional measurements are transmitted to the eNB from the UE. These additional measurement reports allow the eNB to acquire additional knowledge of the WLAN environment and traffic activity characteristics and thus subsequently command one or more of the transfer of previously offloaded traffic back to the LTE networks when beneficial to the UE, the termination of the WLAN connection, or the termination of the LTE connection in order to reduce power consumption at the UE, or consolidate the active wireless connections so as to simplify operations at the UE and/or at the network/eNB.

The additional measurements or measurement report may be referred to as or include a data volume indicator or WLAN activity indicator which may be in the form of numerical measurements or a flag or small number of bits indicating a traffic level associated with the WLAN and the UE, and in particular the level of traffic transmitted to or to be transmitted to the core network via the WLAN. For example, with regards to a numerical measurement, the UE may measure the throughput (bits/s, byte/s etc.) that it is currently experiencing, has recently experienced or anticipates to experience with respect to the WLAN to which it is connected and report this to the eNB. With regards to a flag or other non-numerical indicator, the UE may indicate the whether past, present or anticipated future throughput correspond to one or more predefined levels that may have been previously defined by the eNB or other network entity. Instead of or in additional to these measurements, the UE may also provide at indication to the eNB of the volume of data which it has recently transmitted via the WLAN to the core network or anticipates to transmit via the WLAN to the core network within a predetermined period of time. These measurements may once again be numerical measurements or non-numerical indicators indicating the volume of data relative to one or more thresholds. For instance, in one example the UE may indicate to the eNB that its connection with respect to the WLAN and the core network has been inactive i.e. no data has been transmitted to the core network for a UE specified period or predetermined period of time. Similarly, the UE may also indicate to the eNB via an activity indicator if expects its connection to the WLAN and core network to be inactive for a predetermined period of time since it has little or no future data to transmit over the bearers/IP flows which have been offloaded to the WLAN i.e. an "end of traffic indicator". In other examples, the UE may configure the activity indicator to indicate whether from the UE's point of view it is worthwhile or beneficial to maintain the connection to the core network via the WLAN and/or any offloading. For instance, the UE may conclude that due to non-data volume related factors, such as connection reliability for example, that it considers that it is not worthwhile to continue the offloading of traffic to the WLAN or maintaining a connection to the or network via the WLAN. Throughout the possible implementations the predetermined periods of time may be network configured, UE configured or hardcoded.

The activity indicator may be transmitted to the eNB from the UE as part of a measurement report at predetermined intervals or in response to a particular trigger. For example, the UE may transmits an indication of the current throughput it is experiencing with WLAN when the throughput or average throughput of a period of time drops below or rises above a predetermined threshold. Alternatively, the trigger may be the expiry of a timer running at the UE after a specific event has occurred, such as an instance of traffic offloading for example, or a request from the serving eNB for a measurement report. If the activity indicator provides information on a preceding period of inactivity, the trigger may be a period of inactivity which crosses a predetermined temporal threshold. For example, the activity indicator indicating a period of inactivity lasting 20 s may be transmitted to the eNB when a period of inactivity lasting 20 s is detected at the UE. As a further example, the trigger may be the completion of a specific data transmission such as the streaming of a video for example. Once such an event has taken place, the UE may indicate that it is not expecting to utilise the WLAN for a predetermined period of time.

The activity indicator may be transmitted to the eNB directly via the LTE interface, or in some examples may be transmitted via the WLAN and the core network to the eNB.

Although the information conveyed by the activity indicator may vary, the response by the eNB may be one of returning traffic to the LTE network, maintaining or increasing the current levels of traffic offloading from LTE to WLAN, and termination of one or both of the LTE and WLAN connections in order to reduce power consumption at the UE, where the exact act will be based upon the information conveyed the activity indicator.

For example, in response to the receipt of an activity indicator at the eNB that indicates a current or past throughout with respect to a threshold (i.e. throughput is either high or low), the eNB may for example take one of the following actions:

TABLE 1

| | Throughput | eNB action |
|---|---|---|
| 1 | High | Probably no action since UE is serviced with high rate on WLAN |
| 2 | Low | UE is serviced with low rate due to either low availability of data, or due to congestion in WLAN AP (e.g. radio/backhaul). In these cases it might be preferable to move the traffic to LTE |

Although only two alternative options have been set out in the table above, any number of alternative eNB actions may be specified where their selection is based upon the information provided by the UE. For example, if the UE indicates that it is expected that no data is to be transmitted over the WLAN in the near future, the eNB may command that the UE terminate its WLAN connection. Alternatively, if the UE indicates that it is expected that no data is to be transmitted over the WLAN in the near future and there are no ongoing LTE communications between the eNB and the UE, the eNB may terminate the UE connection with the LTE network and the WLAN.

Figure 4:
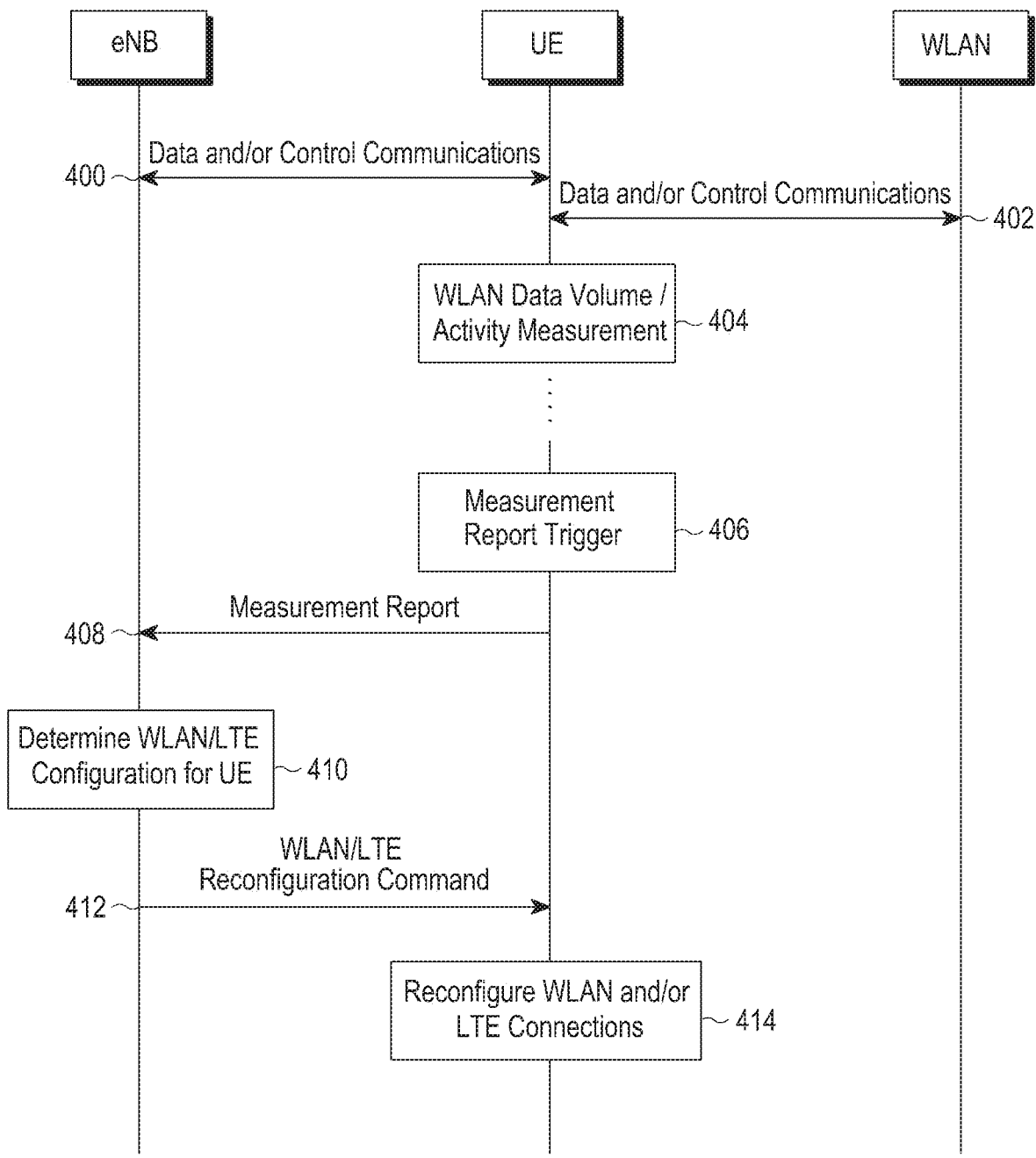
FIG. 4 illustrates a message flow in a WLAN-LTE interworking enhancement architecture in accordance with an embodiment of the present invention.

FIG. 4 provides an illustration of an example message flow diagram between the eNB, UE and WLAN in accordance with the above described embodiment in which an activity indicator is transmitted from the UE to its serving eNB.

Initially, user data and/or control data communications 400 maybe being performed between the UE the eNB, and user data and/or control communications 402 may also be performed between the UE and the core network via the WLAN if data has been previously offloaded from the LTE network to the WLAN. Whilst performing communications with the WLAN, the UE may perform WLAN data volume or activity measurements 404 according to a measurement configuration received from the eNB or a hardcoded configuration. These measurements may include of any measurement(s) required to provide any of the indications discussed above. For example, the current or average throughput the UE is currently experiencing with respect to the WLAN or an anticipated throughput may be measured, or a period of inactivity may be measured. These measurements may be periodically recorded for example such that a recent measurement is available when required or may made is response to a particular trigger.

Subsequently, in response to a measurement report trigger 406, the UE transmits and the eNB receives a measurement report 408 containing an activity indicator to the eNB, where the trigger may take the form of any of the events discussed above. Although the measurement act 404 and the measurement report trigger 406 are shown to be separate events, the measurement may be made in response to the measurement report trigger.

Once received at the eNB, the eNB determines 410 the action that should be taken based on the measurement report and the activity indicator therein with respect to the configuration of the traffic offloading, and WLAN and LTE connections. For example, if it is indicated that the UE does not expect to transmit or receive any data via the WLAN within a predetermined amount of time, the eNB may determine that the WLAN connection should be terminated. Once the required action has been determined, the eNB then transmits and the UE receives a reconfiguration command 412 commanding the UE. Depending on the command issued by the eNB, the UE may then terminate, continue or transfer specified traffic between its LTE and WLAN connections. Upon reception of the WLAN/LTE configuration command from the eNB, the UE then reconfigures 414 its connection in accordance with the command. For example, if the activity indicator indicated that the UE does not expect to transmit or receive any data via the WLAN for a predetermined period of time, the eNB may command the UE to terminate its WLAN connection.

Figure 5:
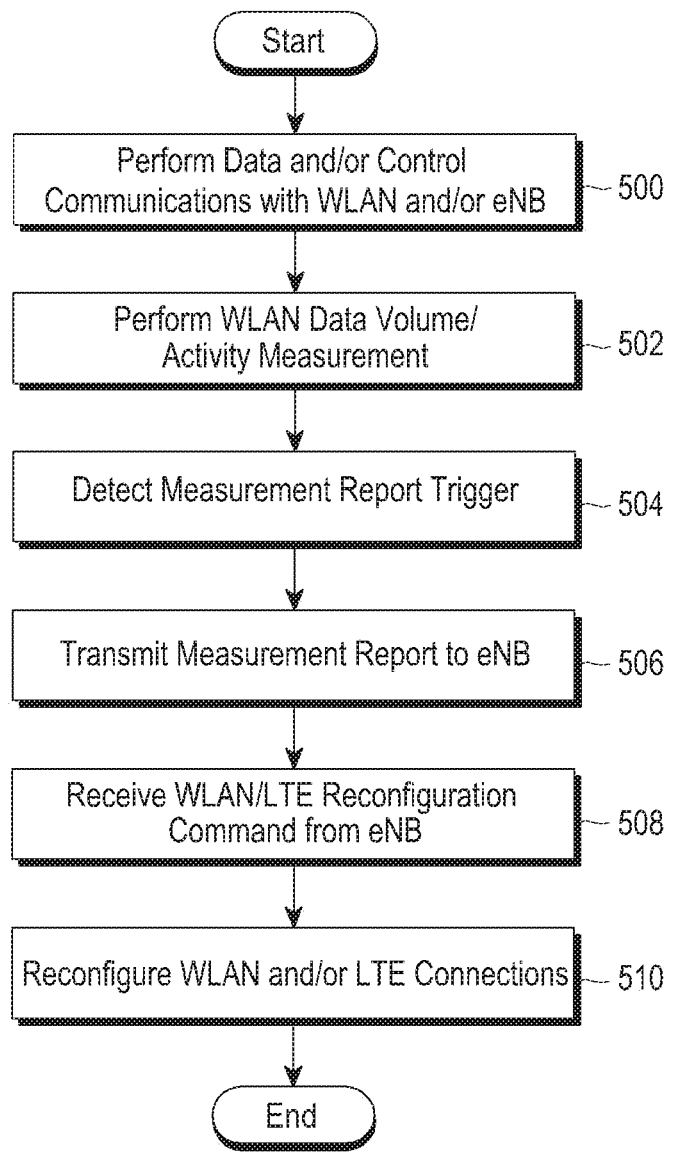
FIG. 5 illustrates a method performed at a UE in a WLAN-LTE interworking enhancement architecture in accordance with the present invention.
Figure 6:
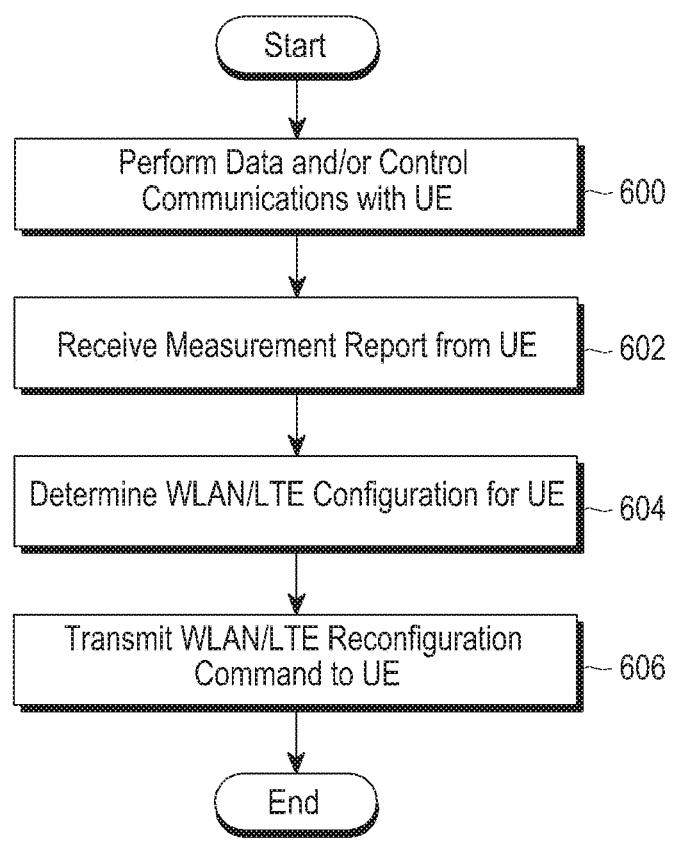
FIG. 6 illustrates a method performed at an eNB in a WLAN-LTE interworking enhancement architecture in accordance with the present invention.

FIGS. 5 and 6 illustrate the processes performed at the UE and the eNB, respectively, when the message flow of FIG. 4 is taking place between these entities.

With respect to FIG. 5 and the UE, the UE initially communicates 500 with one or more of a serving eNB and a WLAN, where traffic which has been previously offloaded from the LTE air interface is communicated between the UE and the core network via the WLAN. During the communications 500 the UE performs WLAN data volume/activity measurements 502 for measuring, for example the past, present or anticipated future throughput of the WLAN with respect to the UE. Subsequently, a measurement report trigger is detected 504 and in response the UE transmits 506 a measurement report containing a data volume indicator to the eNB. In response to the measurement report, if the eNB determines that some form of connection reconfiguration is required, such as offloading traffic from the WLAN to LTE or termination of the WLAN connection, the UE receives 508 a reconfiguration command from the eNB. In response to the reception of a reconfiguration command, the UE may then reconfigure 510 its data transmission and/or LTE and WLAN connections in accordance with the reconfiguration command received from the eNB.

With respect to FIG. 6 and the eNB, the eNB initially performs some of form of user or control data communications 600 with the UE since it is anticipated that the UE will be in LTE connected mode with the eNB. At a later point in time after traffic has been offloaded from LTE to WLAN, the eNB will receives 602 a measurement report from the UE which provides an activity indicator, which may for example relate to the UE's past, present or anticipated future throughput across the WLAN. In response to the reception of the data volume indicator the eNB will determines a WLAN/LTE configuration 604 for the UE as described above, and transmits a reconfiguration command 606 to this effect to the UE if it is determined that reconfiguration is necessary.

Although in FIGS. 4, 5 and 6 numerous steps are taking place at the UE and eNB, not all of these steps are required to take place. For example, although a measurement report may be sent to the eNB, the eNB may determine not to reconfigure the LTE/WLAN connections and thus the steps of 412 and 414 and of FIG. 4, and the corresponding steps of FIGS. 5 and 6, may not occur.

Mobility Command

Instead of handling all traffic of a bearer/PDN in either WLAN or LTE, recent work is ongoing with respect to being able to more dynamically control IP flow mobility across a multi-access PDN, with one access e.g. being LTE and another access e.g. being WLAN. In 3GPP Release 13 a UE may be configured with a multi-access PDN, such that traffic for a PDN can be communicated over LTE and/or WLAN, and more specifically, traffic relating to individual IP flows may offloaded between LTE and WLAN dynamically. Such a mechanism may be referred to as Network Based IP flow mobility (NB-IFOM; TR23.861). The signalling required to perform such IP flow mobility is defined at higher layers of LTE such as in the non-access stratum signalling (NAS) layer, whereby the UE and network can suggest IP flows to be moved from one network to another i.e. LTE to WLAN. Although NB-IFOM is referred to here, it is only one of a number of possible alternative techniques that may be used to negotiate the movement of IP flows between networks.

In 3GPP Release 12, a serving eNB is not able to directly control the offloading of traffic to or from LTE and WLAN since it is only permitted to configure the thresholds which the UE uses to determine the traffic or which bearers to be offloaded. Although as described above with reference to the interworking enhancement, in 3GPP Release 13 the eNB is operable to directly control the offloading of traffic form LTE to WLAN and vice versa by issuing an offload command, the eNB can so far only control the offloading of traffic of entire bearers, such the eNB mandates the transfer of all traffic of bearer from LTE to WLAN or WLAN to LTE. No cooperation/combination of the bearer level interworking enhancement and an IP flow level mobility control mechanism has so far been considered. Consequently, the control over offloading traffic that the eNB has is still limited to bearer level granularity and thus the full benefits of LTE/WLAN offloading may be not be realisable In accordance with an embodiment of the present invention, the eNB is configured to transmit an indication, such as an "offload allowed" command, to the UE indicating that the offloading of zero or more IP flows or data packets of an identified bearer to WLAN or back from WLAN is allowed, rather than the transfer of all IP flows of a bearer being mandated. Such a command may be transmitted in place of the a command which mandates the transfer of all traffic of a bearer i.e. a strict offload, or may be an alternative to the a command such that the eNB may transmit either an "offload" or an "offload allowed" command to the UE. Although the term "offload" is used throughout this disclosure, this term refers to both the offloading of traffic from LTE to WLAN and the transfer of previously offloaded traffic from WLAN to LTE.

The possibility for any number of IP flows of a bearer to be offloaded allows more control to be exerted over the offloading process and may result in more flexible offloading and thus more efficient use of resources at both the network level and/or at the UE level. For example, if a single bearer includes multiple high data rate IP flows and there is relatively limited capacity on both the LTE and WLAN, in accordance embodiments of the present invention, a proportion of the IP flows may be offloaded to WLAN half instead of all of the traffic being on either LTE or WLAN. In this manner the resources of the WLAN and LTE can be more evenly distributed between users without increasing the number of bearers.

The "offload allowed" command may take a number of different forms, each of which provides varying information on the offloading process. In a first example, the command may simply specify that zero or more of the IP flows associated with a bearer are permitted to be offloaded, where no indication of the IP flows which are to be offloaded is given. In a second example, the "offload allowed" command may specify a relative level of traffic, a percentage or absolute value of traffic in terms of IP flows, bytes, packets etc. that are required to be offloaded, where the selection of the IP flows be offloaded may be determined by the UE or a negotiation technique such as NB-IFOM may be used. Alternatively, the "offload allowed" command may specify a minimum or maximum level of traffic which is to be offloaded. In yet another example, the "offload allowed" command may explicitly indicate at least one of the following: the IP flows that are not to be offloaded from their present network, the IP flows that are to be offloaded, and the IP flows that may be handled on either LTE or WLAN. A combination of these indications may also be used, for example it may be mandated that specific IP flows are offloaded to WLAN or returned to WLAN whilst a remaining proportion of the IP flows may be offloaded subject to a UE determination or further negotiation procedures. A number of advantages may arise from the various forms of information provided by the "offload allowed" commands. For instance, when a relative level of traffic i.e. a percentage of IP flows, are specified as being permitted to be offloaded and the UE determines the exact IP flows to offload, the eNB still maintains an element of control over the offloading of IP flows without negotiations between the UE and higher layers being required to determine which IP flows to offload.

Although the eNB may transmit the "offload allowed" command which identifies a bearer whose IP flows may be partially or fully offloaded, where specific IP flows are not specified to be offloaded, the determining of which specific IP flows to offload may performed in a number of different manners. For example, the determination may be performed by the UE, network or negotiated between these two entities, using NB-IFOM for example. In the case of a network controlled offload, further NAS signalling may be utilised to control the UE to offload specific IP flows.

Figure 7:
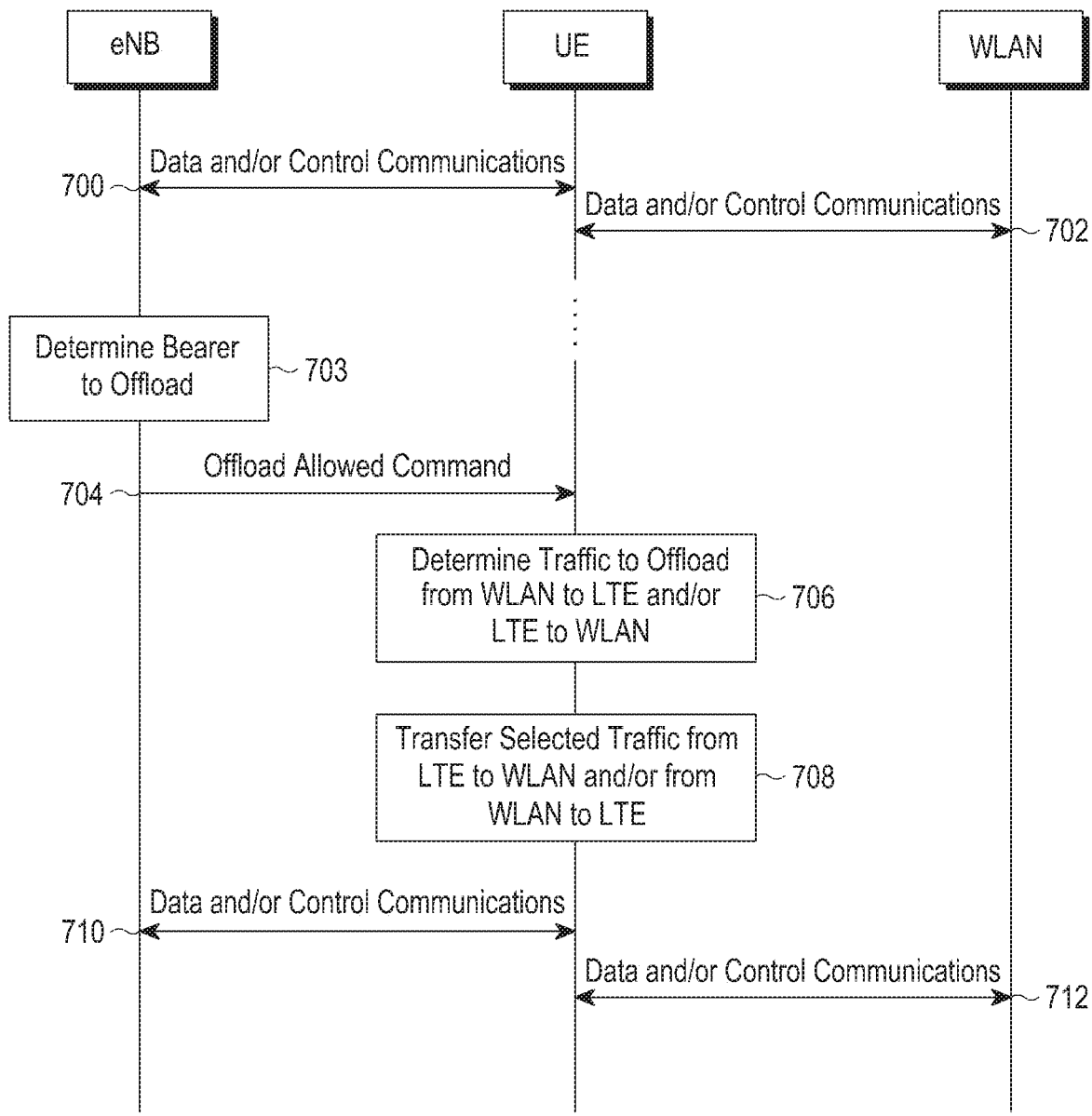
FIG. 7 illustrates a message flow in a WLAN-LTE enhancement architecture in accordance with an embodiment of the present invention.

FIG. 7 provides a message flow diagram of an embodiment in accordance with the present invention. Initially, user data and/or control data communications 700 may be being performed between the UE the eNB, and user data and/or control communications 702 may also be performed between the UE and the core network via the WLAN if data has been previously offloaded from the LTE network to the WLAN. Subsequently, the eNB may determine a bearer the data of which is be offloaded 703 and transmit an offload allowed command 704 to the UE indicating said bearer. The bearer determination and the transmission of the offload allowed command may be in response a suitable trigger event, for example, an increase in network congestion.

The offload allowed command identifies a bearer associated with the UE and includes an indicator which provides an indication that one or more data packets/IP flows associated with the identified bearer are permitted to be transferred from being transmitted to and received form the core network via a WLAN to being transmitted and received via LTE, or permitted to be offloaded from LTE to WLAN. However, as described above, the offload allowed command may indicate a number of different offloading variations. Furthermore, when an offload allowed command is received the IP flows of the identified bearer may have been previously partially offloaded in response to an "offload allowed" command such that the IP flows are already distributed between LTE and WLAN and the subsequent "offload allowed" command permits further offloading.

Upon the receipt of an "offload allowed" command, the UE will determines 706 which traffic or IP flows of the identified bearer are to be offloaded from LTE to WLAN and/or WLAN to LTE. However, as set out above, embodiments of the present invention are not limited to the determination of the IP flows to be transferred being performed by the UE alone. For example, the IP flows to be offloaded may be determined by the eNB/network or via negotiation between two or more of the network, eNB and UE. Alternatively, the UE may receive in the offload allowed command or via further command, information specifying the exact IP flows to offload. Consequently, the determination process 706 may include the transmission of one or more messages between the UE and the eNB/network whereby the determination is performed jointly between the eNB/network and the UE. Accordingly, the act of determining the traffic to offload 706 at the UE may include the UE performing the determination alone or the UE determining the IP flows to offload from a received command which specifies the exact IP flows to offload.

Once the determination is completed, the UE will then proceed to offload 708 the traffic/IP flows of the identified bearer to or from LTE and WLAN. However, in some examples, even though it has been indicated by the offload allowed command that IP flows may be offloaded, offloading is not mandated and so no IP flows of the identified bearer may be offloaded. Contrastingly, though not mandated by an offload allowed command, it is also possible that all IP flows on the identified bearer may be offloaded.

Once the offloading is completed, user and/or control data may then be communicated between the UE to the eNB 710 and from between the UE and the core network via the WLAN 712 in accordance with the determined IP flow offloading.

Figure 8:
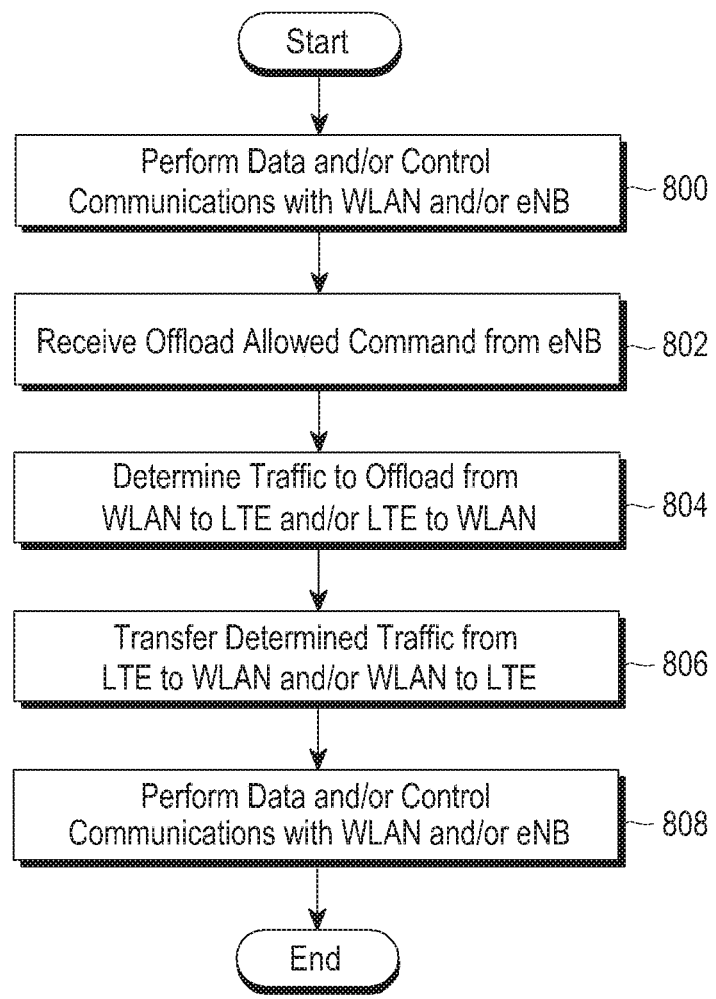
FIG. 8 illustrates a method performed at a UE in a WLAN-LTE interworking enhancement architecture in accordance with the present invention.

FIG. 8 provides a flow diagram of the steps that may be performed at the UE when the message flow of FIG. 7 is performed. Initially, the UE performs communications 800 with the eNB and/or the WLAN, where these communications may include the transmission and reception of both user data control data. Subsequently, the UE receives an offload allowed command 802 from the eNB.

Upon receipt of the offload command permitting the offload of zero or more IP flows of the identified bearer, based on the indication provided by the offload allowed command, it is determined which IP flows of the identified bearers are to be offloaded 804. The offload command identifies a bearer and an option for the offloading of individual IP flows from the identified bearer i.e. full offloading, partial offloading, negotiated offloading, minimum or maximum offloading levels etc. Accordingly, dependent upon the extent of the IP flow offloading specified in the offload command, the determining may be performed solely by the UE, by both the UE and network or by the network alone. Regardless of the mechanism by which the IP flows are determined, one or more control messages may be transmitted between the eNB and the UE to inform each entity of the result of the determination process.

Once the determination is complete, the UE transfers the determined IP flows between LTE and WLAN 806, and then communicates 808 the user and/or control data over the appropriate networks.

Figure 9:
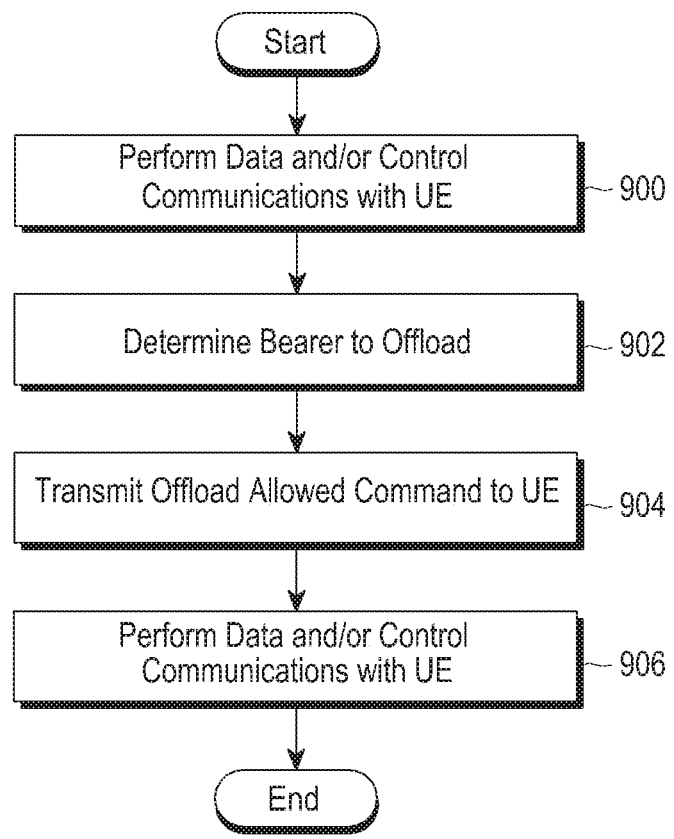
FIG. 9 illustrates a method performed at an eNB in a WLAN-LTE interworking enhancement architecture in accordance with the present invention.

FIG. 9 provides a flow diagram of the steps that may be taken at the eNB when the message flow of FIG. 7 is being performed. Initially, the eNB is communicating 900 user and/or control data with the UE. Subsequently, the eNB determines a bearer 902 whose IP flows are which are permitted to be offloaded. The eNB then transmits an offload command 904 to the UE, where the offload command indicates that one or more of the IP flows within an identified bearer are permitted to be offloaded between LTE and WLAN. Once the determination of the IP flows to offload has been made, the eNB may be informed of the result if it has not taken part in the determination and then communicate user and/or control data 906 associated with the bearers and IP flows whose traffic is to be communicated via LTE.

Although not shown in FIG. 9, one or more messages may be communicated between the eNB and UE when the determination of the IP flows to be offloaded takes place at the eNB or via negotiation between the eNB and the UE. Furthermore, if the eNB explicitly determines the IP flows to offload, this process may occur prior to the transmission of the offload command at 904 and the offload command may include an indication of the determined IP flows.

In FIGS. 7 and 8, only subset of the described actions may take place in some embodiments. For example, if an offload command transmitted to the UE does not mandate the offloading of any IP flows but simply permits the UE to offload IP flows, it may be determined that no IP flows are to be transferred from LTE to WLAN or WLAN to LTE, consequently the steps 708, 806 may not take place.

Figure 10:
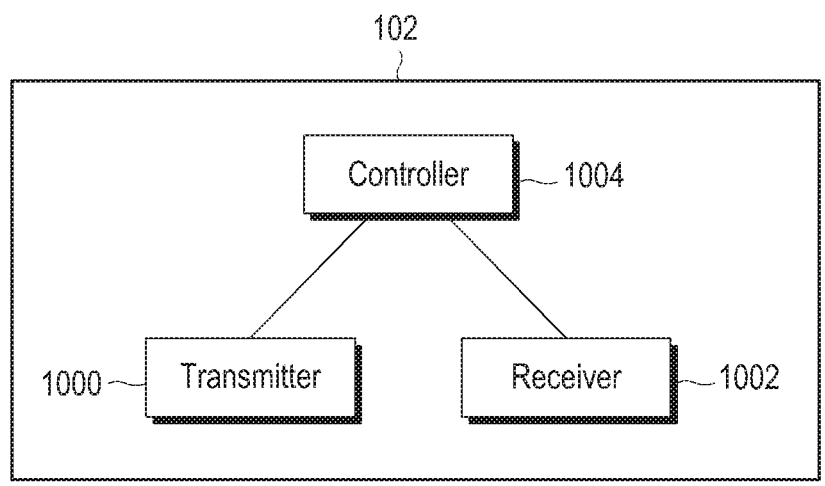
FIG. 10 schematically illustrates the structure of a UE.

FIG. 10 provides a schematic diagram of the structure of a UE which is arranged to operate in accordance with the examples of the present invention described above. The UE includes a transmitter 1000 arranged to transmit user and control data to the eNB, such as measurement reports; a receiver 1002 arranged to receive user and control data from the eNB, such as WLAN/LTE reconfiguration messages and offload allowed commands; and a controller 1004 arranged to control the transmitter and receiver and to perform processing such as determining traffic to offload between LTE and the WLAN.

Figure 11:
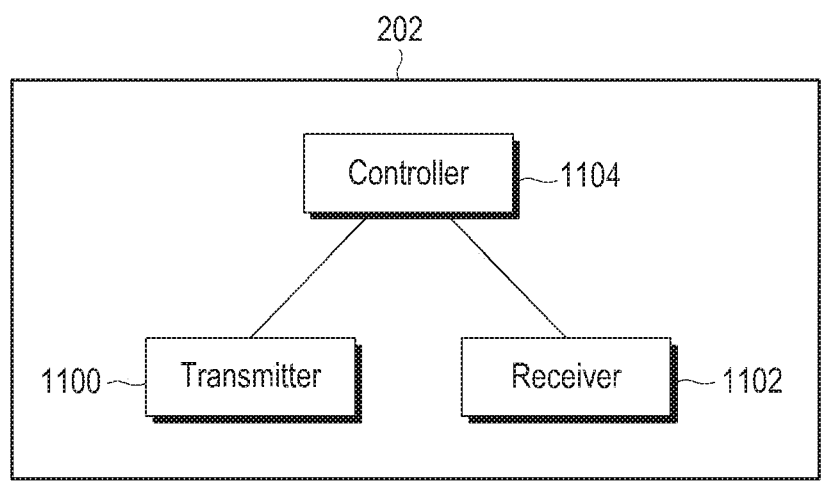
FIG. 11 schematically illustrates the structure of an eNB.

FIG. 11 provides a schematic diagram of the structure of an eNB which is arranged to operate in accordance with the examples of the present invention described above. The eNB includes a transmitter 1100 arranged to transmit user and control data to the UE, such as WLAN/LTE reconfiguration messages and offload allowed commands; a receiver 1102 arranged to receive user and control data from the UE, such as measurement reports; and a controller 1104 arranged to control the transmitter and receiver and to perform processing such as determining WLAN/LTE configurations.

Although in FIGS. 10 and 11 the transmitter, receiver, and controller have been illustrated as separate elements, any single element or plurality of elements which provide equivalent functionality may be used to implement the examples of the present invention described above.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The various embodiments of the present invention may also be implemented via computer executable instructions stored on a computer readable storage medium, such that when executed cause a computer to operate in accordance with any other the aforementioned embodiments.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of a terminal communicating with a wireless local area network (WLAN) in a mobile communication network comprising a core network, the method comprising:
   receiving, from a base station, notification indicating that communication of data to the core network via the WLAN is allowed;
   identifying data to be transmitted via the WLAN to the core network based on first information obtained from the notification;
   transmitting, to the base station of the mobile communication network, second information associated with the identified data after transmitting the identified data to the core network via a connection of the terminal to the WLAN;
   receiving, from the base station, a command for reconfiguring the connection of the terminal to the WLAN, the command being determined based on the transmitted second information; and
   reconfiguring the connection of the terminal to the WLAN based on the received command,
   wherein the first information obtained from the notification includes at least one of a ratio of traffic related to a bearer, a volume of the traffic related to the bearer, or a level of the traffic related to the bearer, and
   wherein the second information associated with the identified data comprises a data rate related to the transmitted data.

2. The method as claimed in claim 1, wherein the reconfiguring step comprises:
   releasing the connection with the WLAN.

3. A method of a base station for controlling offload of a terminal in a mobile communication network comprising a core network, the method comprising:
   transmitting, to the terminal, notification indicating that communication of data to the core network via a wireless local area network (WLAN) is allowed;
   receiving, from the terminal, information associated with data to be transmitted from the terminal to the core network via the WLAN after the data is transmitted to the core network via a connection between the terminal and the WLAN;
   determining reconfiguring of the connection between the terminal and the WLAN based on the received information; and
   transmitting, to the terminal, a command indicating the reconfiguring of the connection between the terminal and the WLAN,
   wherein the notification includes at least one of a ratio of traffic related to a bearer, a volume of the traffic related to the bearer, or a level of the traffic related to the bearer, and
   wherein the information associated with the data comprises a data rate related to the transmitted data.

4. The method as claimed in claim 3, further comprising:
   based on the information indicating that the UE has no data to be transmitted via the WLAN, determining a connection release of the terminal and the WLAN; and
   transmitting, to the terminal, a command indicating the connection release.

5. A terminal for communicating with a wireless local area network (WLAN) in a mobile communication network comprising a core network, the terminal comprising:
   a transceiver; and
   a processor configured to:
      control the transceiver to receive, from the base station, notification indicating that communication of data to the core network via the WLAN is allowed,
      identify data to be transmitted via the WLAN to the core network based on first information obtained from the notification,
      control the transceiver to transmit, to the base station of the mobile communication network, second information associated with the identified data after transmitting the identified data to the core network via a connection of the terminal to the WLAN,
      receive, from the base station, a command for reconfiguring the connection of the terminal to the WLAN, the command being determined based on the transmitted information, and
      reconfigure the connection of the terminal to the WLAN based on the received command,
   wherein the first information obtained from the notification includes at least one of a ratio of traffic related to a bearer, a volume of the traffic related to the bearer, or a level of the traffic related to the bearer, and
   wherein the second information associated with the identified data comprises a data rate related to the transmitted data.

6. The terminal as claimed in claim 5, wherein, based on the information indicating that the UE has no data to be transmitted via the WLAN, the processor is further configured to release the connection with the WLAN based on the received command.

7. A base station for controlling offload of a terminal in a mobile communication network comprising a core network, the base station comprising:
    a transceiver; and
    a processor configured to:
        control the transceiver to transmit, to the terminal, notification indicating that communication of data to mobile communication network via a wireless local area network (WLAN) is allowed,
        receive, from the terminal, information associated with data to be transmitted from the terminal to the core network via the WLAN after the data is transmitted to the core network via a connection between the terminal and the WLAN,
        determine reconfiguring of the connection between the terminal and the WLAN based on the received information, and
        control the transceiver to transmit, to the terminal, a command indicating the reconfiguring of the connection between the terminal to the WLAN,
    wherein the notification includes at least one of a ratio of traffic related to a bearer, a volume of the traffic related to the bearer, or a level of the traffic related to the bearer, and
    wherein the information associated with the data comprises a data rate related to the transmitted data.

8. The base station as claimed in claim 7, wherein, based on the information indicating that the UE has no data to be transmitted via the WLAN, the processor is further configured to:
    determine a connection release of the terminal and the WLAN; and
    control the transceiver to transmit, to the terminal, a command indicating the connection release.

* * * * *